Aug. 11, 1942.       W. MAMMEL ET AL       2,292,706
ELECTRICAL SWITCHING APPARATUS
Filed Oct. 17, 1941       5 Sheets-Sheet 1

INVENTORS
WALTER MAMMEL AND
LINDELL LLOYD CRUMP
BY Em Harrington,
ATTORNEY

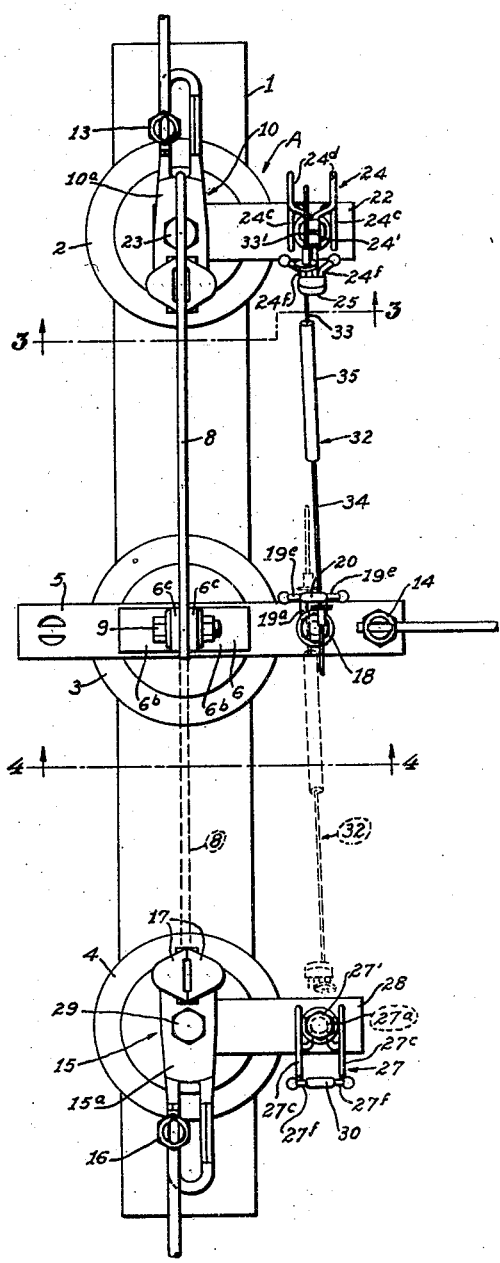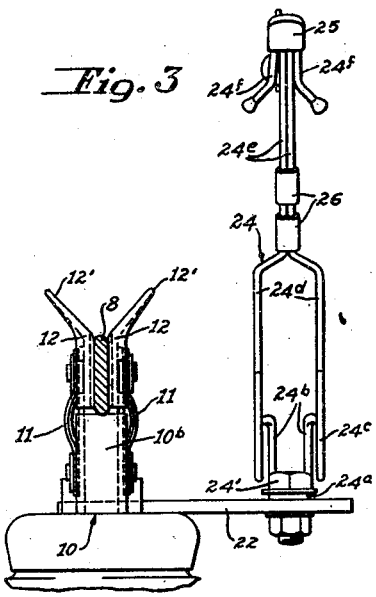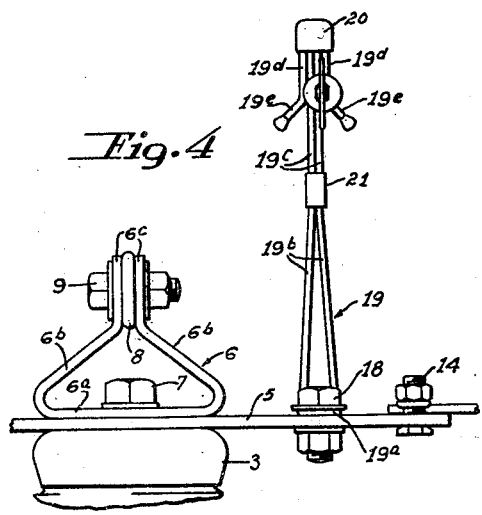

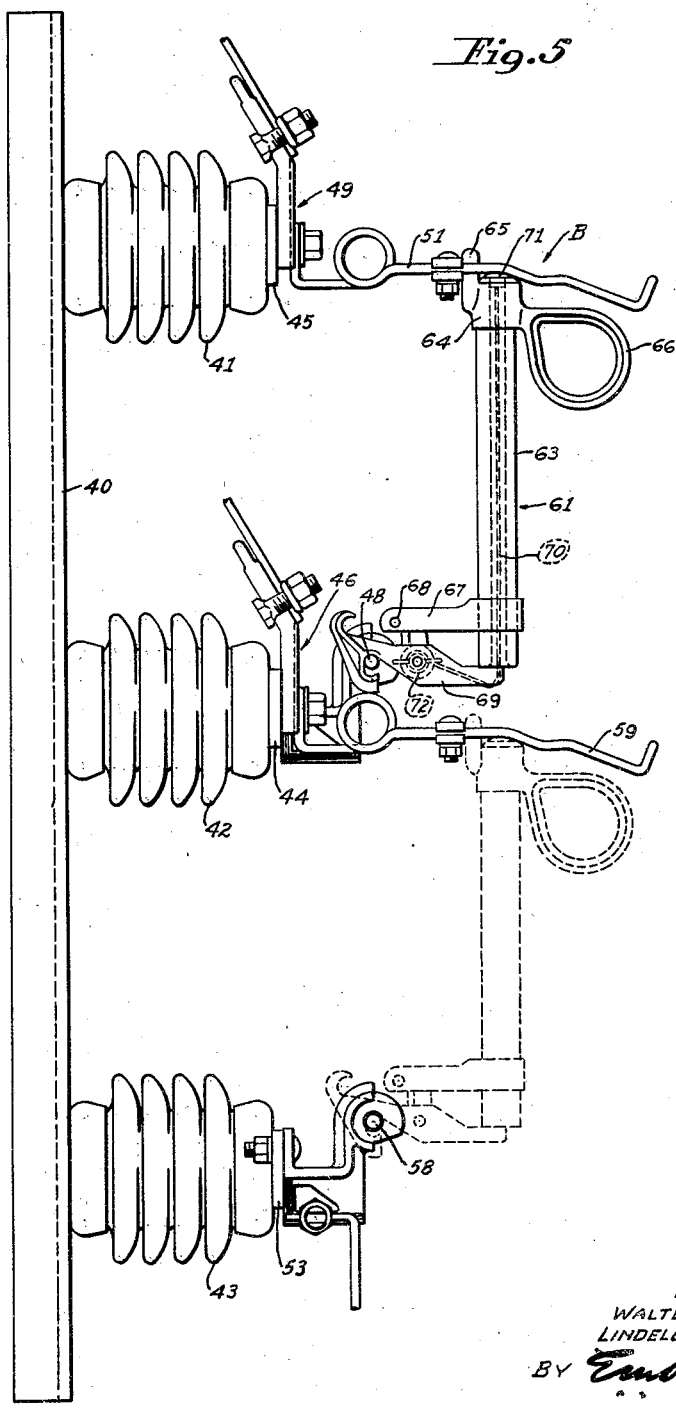

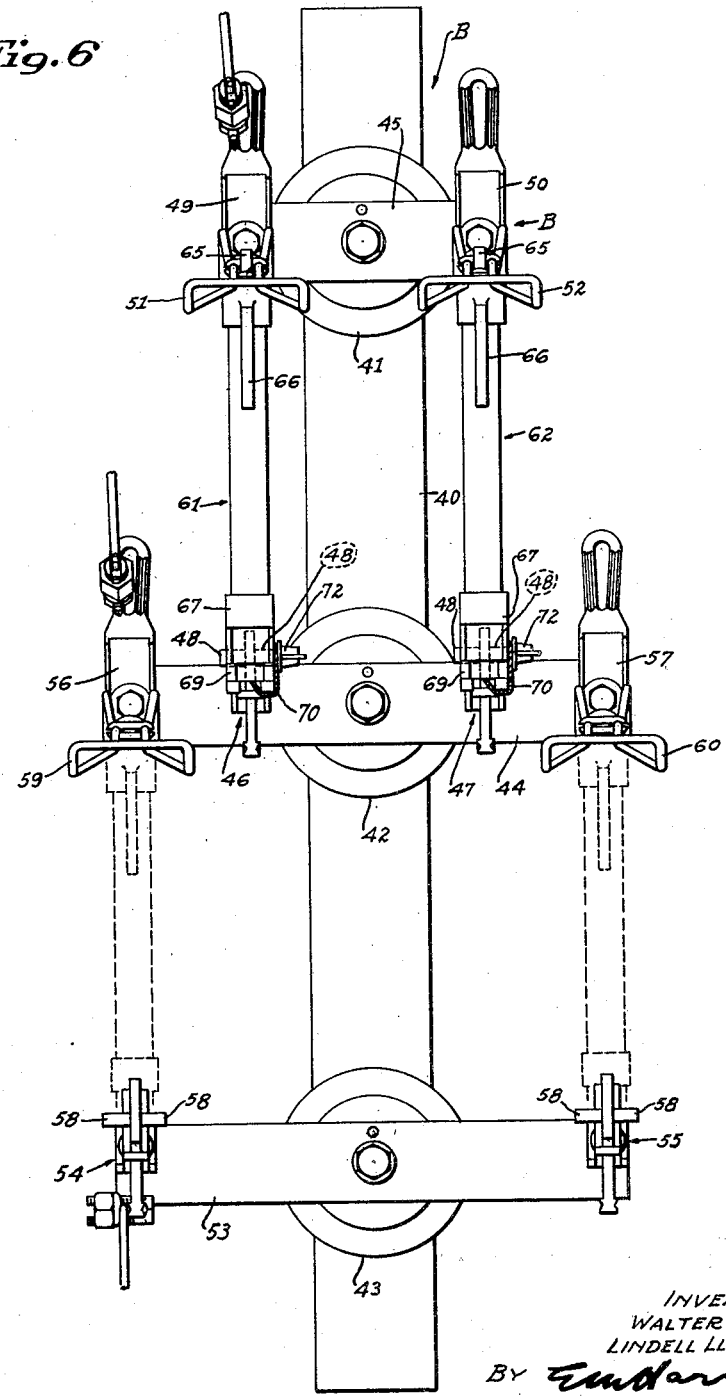

Aug. 11, 1942.  W. MAMMEL ET AL  2,292,706
ELECTRICAL SWITCHING APPARATUS
Filed Oct. 17, 1941  5 Sheets-Sheet 5

INVENTORS
WALTER MAMMEL AND
LINDELL LLOYD CRUMP
BY
ATTORNEY

Patented Aug. 11, 1942

2,292,706

UNITED STATES PATENT OFFICE 2,292,706

ELECTRICAL SWITCHING APPARATUS

Walter Mammel, Nyack, N. Y., and Lindell Lloyd Crump, Kirkwood, Mo., assignors to James R. Kearney Corporation, St. Louis, Mo., a corporation of Missouri Application October 17, 1941, Serial No. 415,340

11 Claims. (Cl. 200—3)

This invention relates generally to electrical switching apparatus and more specifically to a booster transformer by-pass switch structure adapted for use to connect and disconnect a distribution transformer into and from an electrical line, when said distribution transformer is employed as a booster, without interrupting service on the line and without drawing an excessive arc, the predominant object of the invention being to provide an improved switching apparatus of the type referred to above which is of unitary form and contains within itself all the mechanism required to effect the connection and disconnection of a booster transformer from an electrical line, whereby said single, unitary structure is capable of performing a function which prior to this invention was performed by a plurality of separate disconnect switches arranged in combination with a plurality of fuse mountings.

Fig. 2 is a front elevation of the switch structure illustrated in Fig. 1.

Fig. 3 is a horizontal section taken on line 3—3 of Fig. 2.

Fig. 4 is a horizontal section taken on line 4—4 of Fig. 2.

Fig. 5 is a side elevation of another form of the invention.

Fig. 6 is a front elevation of the switch structure illustrated in Fig. 5.

Figure 1:
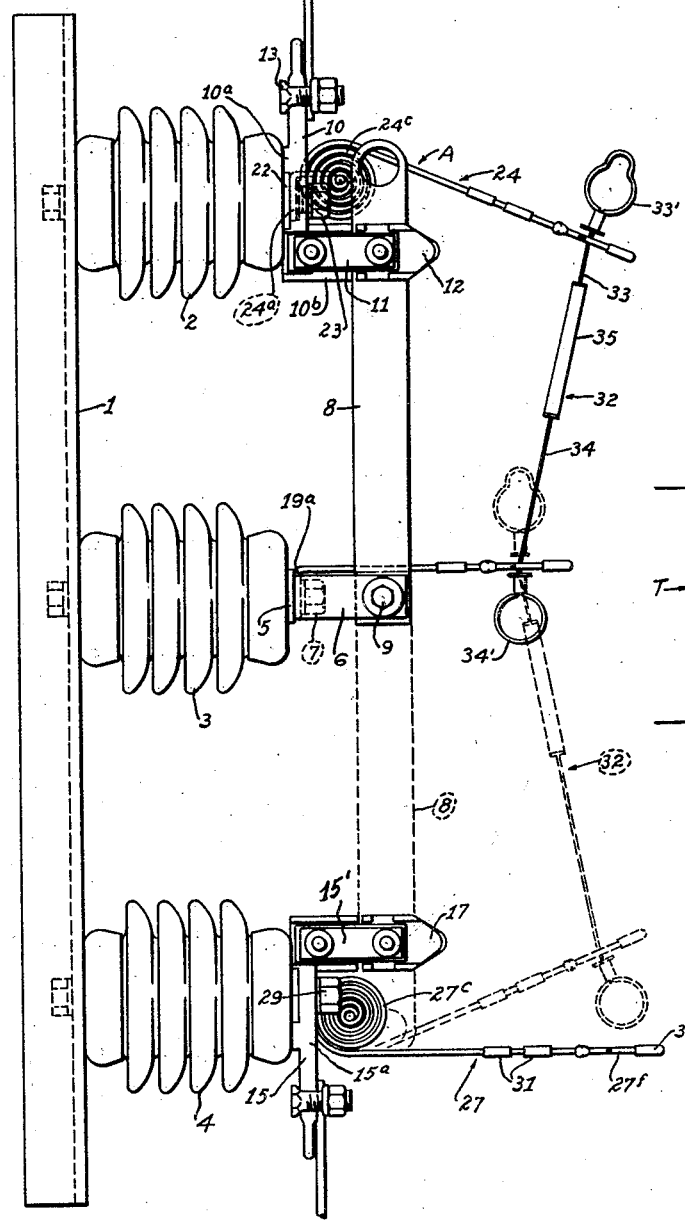
Fig. 1 is a side elevation of one form of the improved switch structure.

In the drawings, wherein are shown for the purpose of illustration, merely, several embodiments of the invention, and referring particularly for the present to Figs. 1 to 4, inclusive, A designates generally the improved switch structure illustrated therein. The switch structure A of Figs. 1 to 4, inclusive, includes a suitably supporting member 1 on which are fixedly mounted in vertically spaced relation a plurality of outstanding insulators 2, 3, and 4. The insulator 3 has fixed thereto at its outer end a transversely extended bar 5 which is formed of electrical conducting material. The bar 5 has fixed thereto an element 6 which is shaped as is shown to best advantage in Fig. 4; that is to say, said element 6 is provided with a base portion 6a that contacts with the bar 5, convergent portions 6b that extend outwardly from the opposite ends of said base portion, and ear portions 6c which extend outwardly from the outer ends of said convergent portions and are spaced apart. The bar 5 and the element 6 are secured to the insulator 3 by a bolt 7 as is shown in Figs. 1 and 4. Pivotally supported by the element 6 is a switch blade 8, an end portion of said switch blade 8 being disposed between the spaced ear portions 6c of the element 6 and a pivot bolt 9 being extended through openings formed through said ear portions and through said switch blade to effect pivotal connection therebetween.

The insulator 2 has fixed thereto a terminal 10 which comprises a vertically disposed portion 10a and a horizontal portion 10b which extends outwardly from the lower portion of said vertical portion 10a. The horizontal portion 10b of the terminal 10 has fixed thereto at opposite sides thereof a pair of resilient elements 11 (Fig. 3) which have fixed to their outer end portions a pair of contact members 12 that are provided with flared extensions 12'. The upper portion of the terminal 10 is of loop formation and said portion receives a suitable connector 13 through the instrumentality of which a conductor, forming a part of the circuit with which the switch structure is electrically associated, is electrically connected to said terminal 10. Likewise the bar 5 has associated therewith a suitable connector 14 which electrically connects to said bar a conductor forming a part of the electrical circuit with which the switch structure is associated.

Fixedly supported by the insulator 4 is a terminal 15 which is similar in construction to the terminal 10 but is supported on the terminal 4 in an inverted manner relative to said terminal 10. In other words, the terminal 15 includes a horizontal portion at its upper end, and a vertical portion 15a that extends downwardly from said horizontal portion and which is provided with a loop portion at its lower end that receives a suitable connector 16 which serves to electrically connect to said terminal 15 a conductor forming a part of the associated circuit. Likewise the terminal 15 has associated therewith a pair of resilient elements 15' which are similar to the resilient elements 11 of the terminal 10 and which support a pair of contact members 17 provided with flared extensions.

The structure thus far described in detail herein constitutes a single pole, double-throw switch, as, obviously, the switch blade 8 may be moved upwardly to force a portion thereof between the contact members 12 of the terminal 10 to provide an electrical path between the bar 5 and the terminal 10, and also, the switch blade 8 may be moved downwardly to force a portion thereof between the contact members 17 of the terminal 15 and thereby provide an electrical path between the bar 5 and said terminal 15.

Secured to the bar 5 by a bolt 18 is a contact 19, said contact 19 being formed of substantially heavy wire and being of substantial stiffness. The contact 19 is provided with a loop portion 19a at its rear end through which the shank of the bolt 18 extends, said bolt shank being extended also through an opening formed through the bar 5. Extended outwardly from the loop portion 19a of the contact 19 are convergent portions 19b which merge into parallel, contacting portions 19c, said portions 19c being bent rearwardly at their forward ends, as shown in Fig. 4, to provide gripping portions 19d having flared end portions 19e. At its outer end the contact 19 is provided with a cap 20 which serves to prevent undue spreading of the gripping portions 19d, and, also, a band 21 is applied to the contact 19 at a point intermediate at its ends to retain the portions 19b and 19c in their proper positions.

The terminal 10 has secured thereto a plate 22 which is formed of electrical conducting material, said plate and said terminal being secured in electrical contact with each other and being fixed to the insulator 2 by a bolt 23. Secured to the plate 22 in spaced relation with respect to the terminal 10 is an upper contact 24, said upper contact being formed from a single length of relatively heavy wire. The upper contact 24 is provided with a loop portion 24a at its rear end through which the shank of an attaching bolt 24' is extended and from which is extended forwardly a pair of spaced portions 24b which lead into the centers of a pair of spaced helically wound contact portions 24c. Spaced, parallel portions 24d lead forwardly from the helically wound contact portions 24c, and these portions 24d merge into contacting parallel portions 24e which at their forward ends are bent rearwardly upon themselves to provide gripping portions 24f having flared end portions. At the outer end of the upper contact 24 a cap 25 is applied thereto which prevents undue spreading of the gripping portions 24f, and the contacting parallel portions 24e are maintained in their proper positions by bands 26 which embrace said portions 24e.

The switch A includes also a lower contact 27 which is secured to a plate 28 that is formed of electrical conducting material and is secured in electrical contact with the terminal 15 by a bolt 29, said bolt also serving to secure the terminal 15 and the plate 28 to the lower insulator 4. The lower contact 27 is constructed in accordance with the upper contact 24, but said lower contact 27 is inverted with respect to the upper contact 24. In other words, the lower contact includes an upwardly extended loop portion 27a at its rear end through which the shank of an attaching bolt 27' extends, and forwardly extended portions of said contact lead from said loop portion to the centers of helically wound contact portions 27c. As in the case of the upper contact 24, convergent contact portions of the lower contact 27 lead from the helically wound portions 27c thereof and merge into contacting, parallel contact portions, and said contacting parallel contact portions are bent rearwardly upon themselves at their outer ends to provide gripping portions 27f which are provided with flared end portions. Also the lower contact 27 has a cap 30 applied to the outer end thereof which prevents undue spreading of the gripping portions 27f thereof, and bands 31 embrace intermediate portions of the lower contact to retain said contact portions in their proper positions.

The switch A includes a fuse link 32 which comprises a pair of conductors 33 and 34 that are joined within a tube 35 of insulation material by a fusible section (not shown), said conductors 33 and 34 being provided at their outer ends with tool-receiving eye portions 33' and 34'. When the fuse link 32 is being applied to the switch A as shown in Figs. 1 and 2 a portion of the conductor 33 of said fuse link is drawn, by a suitable tool applied to the eye portion 33', into a position where it is gripped between one of the gripping portions 24f of the upper contact 24 and an adjacent portion 24e of said upper contact. The tool is then applied to the eye portion 34' and the fuse link is moved downwardly to draw the outer end portion of the upper contact 24 downwardly, a portion of the conductor 34 of the fuse link then being drawn into a position where it is gripped between one of the gripping portions 19d of the intermediate contact 19 and a portion 19c of said intermediate contact. When the outer portion of the upper contact 24 is held in a downward position, as shown in Fig. 1, the fuse link is placed under tension due to the tendency of the helical portions of the upper contact to restore the outer end portions of said upper contact to its upward position. Therefore, when in the operation of the switch A, the fuse link 32 is ruptured within the tube 35, restraint imposed on the outer end portion of the upper contact 24, by the unruptured fuse link is removed and the stressed helical portion 24c of the upper contact will snap the outer portion of said upper contact upwardly to quickly pull the ruptured ends of the fuse link apart and extinguish the arc produced within the tube 35 between the ruptured ends of the fuse link.

The fuse link 32 may be arranged in the switch A in the manner shown by full lines in Figs. 1 and 2 where it connects the upper contact 24 and the intermediate contact 19, or said fuse link may be arranged in said switch A as shown by dotted lines in Figs. 1 and 2 where it connects the lower contact 27 and the intermediate contact 19. When the fuse link is in the latter position the outer end portion of the lower contact 27 is held in an upward position by the tensioned fuse link, whose conductors 33 and 34 are gripped adjacent to their outer ends by the gripping portions of said lower contact 27 and said intermediate contact 19. Obviously, in this situation rupture of the fuse link will remove the restraint from the lower contact 27 imposed thereon by the unruptured fuse link, thereby permitting the stressed helical portions of said lower contact to snap the outer end portion of said lower contact in a downwardly direction to quickly separate the ruptured ends of the fuse link and extinguish the arc therebetween.

Figure 9:
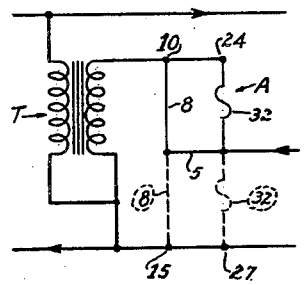
Fig. 9 is a diagrammatical wiring detail illustrating the manner of electrically connecting the improved switch structure into an electrical line which has a booster transformer associated therewith.

In Fig. 9 of the drawings a diagrammatical view is shown that illustrates a circuit which includes a transformer T that serves as a booster, and one of the improved switch structures A. In Fig. 9 the blade 8 of the switch A is shown by full lines in a position where it electrically connects the bar 5 with the upper terminal 10, and the fuse link 32, is shown by full lines in parallel with the blade 8 where it also electrically connects the bar 5 with the upper terminal 10. When the blade and the fuse link 32 of the switch A are positioned in parallel as illustrated in Fig. 9, the path of current is through the blade 8 in series with the current coil of the booster transformer, whereby the transformer serves to boost the voltage, for example, from 2300 volts to 2530 volts.

If it be desired to remove the booster transformer from the line without breaking the circuit and interrupting service, the blade 8 is withdrawn from contact with the upper terminal 10 and is thrown into contact with the lower terminal 15, as shown by dotted lines in Fig. 9 and while the blade 8 is being moved from its position of contact with the upper terminal 10 to its position of contact with the lower terminal 15, the fuse link 32 carries the line load, being of proper capacity to do so. However, after the blade 8 makes proper contact with the lower terminal 15, the fuse link 32 is in a short circuit across the current coil of the transformer with the result that the fuse link is ruptured, since the short circuit current of the current coil of the booster transformer is from 20 to 30 times the normal full load current, and the outer portion of the upper contact 24 snaps upwardly to quickly separate the ruptured ends of the fuse link. When this condition has been brought about as described above the booster transformer is off of the line and service on the circuit has not been interrupted.

The next operation is to introduce a new fuse link 32 in place in the switch A in parallel with the blade 8 where it electrically connects the intermediate contact 19 and the lower contact 21, and when this has been done the switch A is in readiness to put the booster transformer back into service when desired. This is done by moving the blade 8 from its position of contact with the lower terminal 27 to a position of contact with the upper terminal 10, and while such movement of the blade 8 is taking place the fuse link is again called upon to carry the full load current. However, when the blade 8 is moved into proper contact with the upper terminal 10 the fuse link 32 is again in the short circuit of the current coil of the booster transformer and the excessive short circuit current of the current coil of the transformer will cause the fuse link to rupture and leave the booster transformer in the service position. A new fuse link is then arranged in the switch A in parallel with the blade 8 where it electrically connects the intermediate contact 19 and the upper contact 10 and the switch A is ready for subsequent operation.

From the foregoing it is clear that the present invention provides a complete cycle of operations for placing a booster transformer in service and withdrawing a booster transformer from service through the use of a single, unitary switch structure, and without interrupting the service on the circuit at any time.

In Figs. 5 and 6 a form of the invention is illustrated which comprises a switch structure B that includes a suitable support 40 which supports a plurality of vertically spaced, outstanding insulators 41, 42, and 43. The insulator 42 supports a bar 44 and the insulator 41 supports a bar 45, the bar 44 having fixed thereto a pair of spaced terminals 46 and 47 provided each with oppositely extended trunnions 48. Also, the bar 45 of the insulator 41 has fixed thereto a pair of spaced terminals 49 and 50 which are alined vertically with the terminals 46 and 47 and which have fixed thereto and extended outwardly therefrom resilient contacts 51 and 52. Likewise the insulator 43 has fixed thereto a bar 53 to which is secured a pair of spaced terminals 54 and 55, and these terminals 54 and 55 are alined vertically with a pair of terminals 56 and 57 that are secured to the bar 44 of the insulator 42. The terminals 54 and 55 are constructed and arranged in accordance with the terminals 46 and 47, said terminals 54 and 55 being each provided with oppositely extended trunnions 58. Additionally, the terminals 56 and 57 have fixed thereto and extended outwardly therefrom resilient contacts 59 and 60 similar to the resilient contacts 51 and 52 of the terminals 49 and 50 which are secured to the bar 45 of the insulator 41.

Associated with the terminals 46 and 47 is a pair of switch cartridges 61 and 62, each of which comprises a tube 63 having a head 64 mounted at its upper end which is provided with an upstanding finger 65 adapted to extend between spaced portions of the resilient contacts 51 and 52 so as to be engaged therebetween, and a tool-receiving eye portion 66. Supported on the tube 63 of each cartridge 61 and 62 is a bracket 67 to which is pivoted by the pivot element 68 a hinge member 69. The hinge member 69 of each cartridge 61 and 62 is bifurcated at its rear end so that parts of said bifurcated portion are disposed at opposite sides of the associated terminal, and said oppositely disposed parts of said bifurcated portion of the hinge member are shaped so as to engage the trunnions 48 of the associated terminal for pivotal movement with respect thereto. The tube 63 of each cartridge 61 and 62 has extended therethrough a conductor 70 which is attached to a cap 71 at its upper end, the lower end portion of said conductor 70 being extended from the tube and being turned about a portion of the forward part of the hinge member 69 and being attached to the hinge member by wing nut 72. The conductor 70 of the cartridge 61 is a non-fusible conductor which causes said cartridge 61 to assume the character of a solid switch blade, while the conductor 70 of the cartridge 62 is in the form of a fuse link that is adapted to be ruptured as a result of passage of abnormal current therethrough.

In the use of the form of the invention illustrated in Figs. 5 and 6, the cartridge 61 serves the function of the blade 8 of the form of the invention shown in Figs. 1 to 4, inclusive, while the cartridge 62 of Figs. 5 and 6 serves the function of the fuse link 32 of Figs. 1 to 4, inclusive. In other words, when the cartridges 61 and 62 are supported by the trunnions 48 of the terminals 46 and 47 and are engaged at their upper ends by the resilient contacts 51 and 52, the arrangement is the same as that in which the blade 8 and the fuse link 32 are shown in Fig. 9. Now, when it is desired to take an associated booster transformer out of service, the cartridge 61 is detached from the trunnions 48 of the terminal 46 and from the resilient contact 51, and said cartridge is applied to the trunnions 58 of the terminal 54 and is moved into electrical contact with the resilient contact 59. Such contact of the cartridge 61 with the resilient contact 59 places the cartridge 62 in short circuit across the current coil of the transformer and the fuse link 70 of said cartridge 62 is ruptured by the abnormal current passing therethrough. This frees the outer end of the hinge member 69 from the restraint normally imposed thereon by the unfused fuse link 70 of said cartridge 62, with the result that said hinge member turns about the axes defined by the trunnions 48 and the pivot element 68 to cause an endwise lowering of the cartridge tube, which, when clear of the resilient contact 52, swings under gravity action to full, open position. The cartridge is then refused and is applied to the terminal 55 and the resilient contact 60, where it is again in parallel with the cartridge 61, and the transformer has been taken out of service without interruption of service.

To replace the transformer in service the cartridge 61 is removed from contact with the terminal 54 and the resilient contact 59 and is applied to the terminal 46 and the resilient contact 51 in electrical contact therewith. This places the cartridge 62 in short circuit across the current coil of the transformer and the fuse link 70 thereof will be ruptured by passage of abnormal current therethrough thereby causing said cartridge 62 to trip out as has been previously explained. The cartridge 62 is then removed and refused and is arranged parallel with the cartridge 61, and the transformer is then in a complete service condition.

Figure 7:
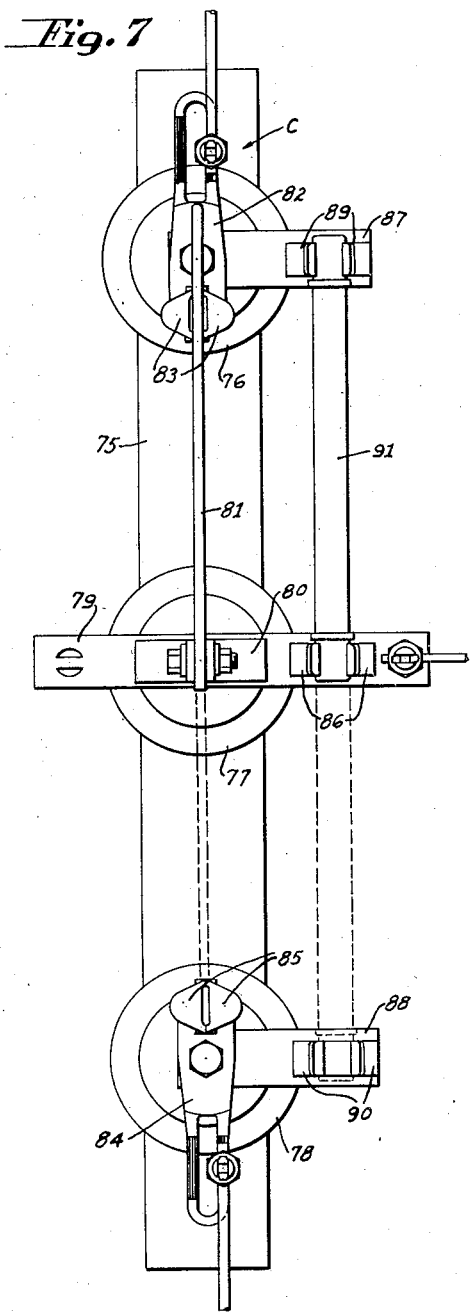
Fig. 7 is a front elevation of still another form of the invention.
Figure 8:
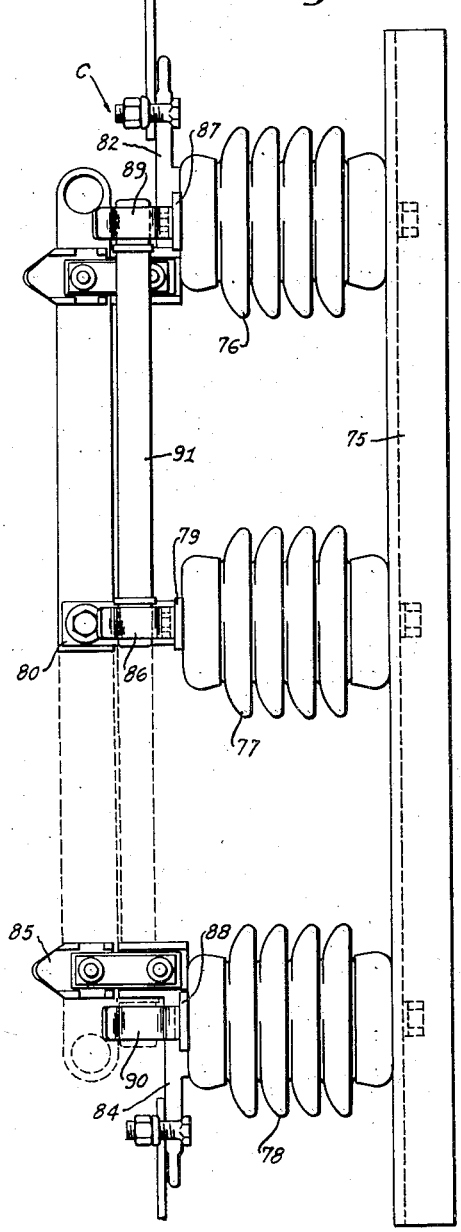
Fig. 8 is a side elevation of the switch structure illustrated in Fig. 7.

The form of the invention illustrated in Figs. 7 and 8 closely resembles the form of the invention shown in Figs. 1 to 4, inclusive, with the exception that the structure of Figs. 7 and 8 includes a cartridge-type fuse instead of the fuse link 32 of Figs. 1 to 4, inclusive. In other words, the structure C of Figs. 7 and 8 includes a support 75 to which are fixed a plurality of vertically spaced insulators 76, 77, and 78. The insulator 77 has fixed thereto a bar 79 to which is fixed a hinge element 80 between spaced portions of which an end portion of a switch blade 81 is pivotally supported. Fixed to the insulator 76 is a terminal 82 which supports yieldably supported contacts 83, and fixed to the insulator 78 is a similar terminal 84 that supports similar yieldingly supported contacts 85. As in the case of the blade 8 of the structure shown in Figs. 1 to 4, inclusive, the blade 81 of Figs. 7 and 8, is a single pole, double throw switch, the outer end of said blade being movable either into contact with the contacts 83 of the terminal 82 or with the contacts 85 of the terminal 84 to place one or the other of said terminals 82 and 84 in electrical connection with the bar 79. The bar 79 has mounted thereon a set of spring clips 86 and the insulators 76 and 78 support bars 87 and 88, respectively, which likewise support sets of clips 89 and 90. The structure of Figs. 7 and 8 includes also a cartridge-type fuse cartridge 91 which may be introduced in engagement either with the clips 86 and 89 to electrically connect the bars 79 and 87, or with the clips 86 and 90 to electrically connect the bars 79 and 88.

The switch structure C of Figs. 7 and 8 is capable of the same use and operation as has already been described herein in connection with the structure of Figs. 1 to 4, inclusive. That is to say, the blade 81 may be moved into and out of electrical connection with the terminals 82 and 84, and the cartridge-type fuse 91 may be arranged in engagement and in electrical connection with either the clips 86 and 89 or with the clips 86 and 90, for the purposes hereinbefore set forth in the description of the operation of the switch structure illustrated in Figs. 1 to 4, inclusive.

We claim:

1. A unitary switch structure comprising a group of terminals supported out of electrical connection with respect to each other, a switch member adapted to be positioned where it electrically connects certain of the terminals of said group of terminals and adapted for disposition in a different position where it makes electrical connection between certain different terminals of said group of terminals, a second group of terminals supported out of electrical connection with respect to each other, fusible means adapted to be positioned where it electrically connects certain of the terminals of said second group of terminals and adapted for disposition in a different position where it electrically connects certain different terminals of said second group of terminals, and conducting means for electrically connecting certain of the terminals of the first group of terminals with certain of the terminals of the second group of terminals.

2. A unitary switch structure comprising a group of terminals supported out of electrical connection with respect to each other, a switch member adapted to be positioned where it electrically connects certain of the terminals of said group of terminals and adapted for disposition in a different position where it makes electrical connection between certain different terminals of said group of terminals, a second group of terminals supported out of electrical connection with respect to each other, fusible means adapted to be positioned where it electrically connects certain of the terminals of said second group of terminals and adapted for disposition in a different position where it electrically connects certain different terminals of said second group of terminals, and conducting means for supporting and electrically connecting certain of the terminals of the first group of terminals with certain of the terminals of the second group of terminals.

3. A unitary switch structure comprising a group of spaced terminals supported out of electrical connection with respect to each other and providing an intermediate terminal and a pair of outer terminals spaced from said intermediate terminal in opposite directions, supporting members for supporting said terminals, a switch member adapted to be positioned where it electrically connects certain of the terminals of said group of terminals and adapted for disposition in a different position where it makes electrical connection between certain different terminals of said group of terminals, a second group of terminals supported by said supporting members out of electrical connection with respect to each other and providing an intermediate terminal and a pair of outer terminals spaced from said intermediate terminal in opposite directions, and fusible means adapted to be positioned where it electrically connects certain of the terminals of said second group of terminals and adapted for disposition in a different position where it electrically connects certain different terminals of said second group of terminals, said supporting members being formed of electrical conducting material and serving to electrically connect the terminals of the first and second groups of terminals which are supported thereby.

4. A unitary switch structure comprising a group of spaced terminals supported out of electrical connection with respect to each other and providing an intermediate terminal and a pair of outer terminals spaced from said intermediate terminal in opposite directions, a switch member adapted to be positioned where it electrically connects said intermediate terminal and one of said outer terminals and adapted to be positioned in a different position where it electrically connects said intermediate terminal and the other of said outer terminals, a second group of terminals supported out of electrical connection with respect to each other and providing an intermediate terminal and a pair of outer terminals spaced from said intermediate terminal in opposite directions, fusible means adapted to be positioned where it electrically connects said intermediate terminal of said second group of terminals and one of the outer terminals of said second group of terminals and adapted to be positioned in a different position where it electrically connects said intermediate terminal and the other of said outer terminals of said second group of terminals, and means for electrically connecting respectively, the intermediate terminals of said first and second groups of terminals, the outer terminals of said first and second groups of terminals located at one side of the intermediate terminals of said first and second groups of terminals, and the outer terminals of said first and second groups of terminals located at the opposite side of the intermediate terminals of said first and second groups of terminals.

5. A unitary switch structure comprising a group of spaced terminals supported out of electrical connection with respect to each other and providing an intermediate terminal and a pair of outer terminals spaced from said intermediate terminal in opposite directions, a switch member adapted to be positioned where it electrically connects said intermediate terminal and one of said outer terminals and adapted to be positioned in a different position where it electrically connects said intermediate terminal and the other of said outer terminals, a second group of terminals supported out of electrical connection with respect to each other and providing an intermediate terminal and a pair of outer terminals spaced from said intermediate terminal in opposite directions, fusible means adapted to be positioned where it electrically connects said intermediate terminal of said second group of terminals and one of the outer terminals of said second group of terminals and adapted to be positioned in a different position where it electrically connects said intermediate terminal and the other of said outer terminals of said second group of terminals, and means for electrically connecting respectively, the intermediate terminals of said first and second groups of terminals, the outer terminals of said first and second group of terminals located at one side of the intermediate terminals of said first and second groups of terminals, and the outer terminals of said first and second groups of terminals located at the opposite side of the intermediate terminals of said first and second groups of terminals, said means for electrically connecting certain of the terminals of the first and second groups of terminals serving also to support the terminals electrically connected thereby.

6. A unitary switch structure comprising a group of spaced terminals supported out of electrical connection with respect to each other and providing an intermediate terminal and a pair of outer terminals spaced from said intermediate terminal in opposite directions, a switch member adapted to be positioned where it electrically connects said intermediate terminal and one of said outer terminals and adapted to be positioned in a different position where it electrically connects said intermediate terminal and the other of said outer terminals, a second group of terminals supported out of electrical connection with respect to each other and providing an intermediate terminal and a pair of outer terminals spaced from said intermediate terminal in opposite directions, fusible means adapted to be positioned where it electrically connects said intermediate terminal of said second group of terminals and one of the outer terminals of said second group of terminals and adapted to be positioned in a different position where it electrically connects said intermediate terminal and the other of said outer terminals of said second group of terminals, and means for electrically connecting respectively, the intermediate terminals of said first and second groups of terminals, the outer terminals of said first and second groups of terminals located at one side of the intermediate terminals of said first and second groups of terminals, and the outer terminals of said first and second groups of terminals located at the opposite side of the intermediate terminals of said first and second groups of terminals, said means for electrically connecting certain of the terminals of the first and second groups of terminals comprising spaced bars serving also to support the terminals electrically connected thereby.

7. A unitary switch structure comprising a group of spaced terminals supported out of electrical connection with respect to each other and providing an intermediate terminal and a pair of outer terminals spaced from said intermediate terminal in opposite directions, a switch member adapted to be positioned where it electrically connects said intermediate terminal and one of said outer terminals and adapted to be positioned in a different position where it electrically connects said intermediate terminal and the other of said outer terminals, a second group of terminals supported out of electrical connection with respect to each other and providing an intermediate terminal and a pair of outer terminals spaced from said intermediate terminal in opposite directions, fusible means adapted to be positioned where it electrically connects said intermediate terminal of said second group of terminals and one of the outer terminals of said second group of terminals and adapted to be positioned in a different position where it electrically connects said intermediate terminal and the other of said outer terminals of said second group of terminals, means for electrically connecting respectively, the intermediate terminals of said first and second groups of terminals, the outer terminals of said first and second groups of terminals located at one side of the intermediate terminals of said first and second groups of terminals, and the outer terminals of said first and second groups of terminals located at the opposite side of the intermediate terminals of said first and second groups of terminals, said means for electrically connecting certain of the terminals of the first and second groups of terminals comprising spaced bars serving also to support the terminals electrically connected thereby, and insulating means for supporting said spaced bars and the terminals of said first and second groups of terminals.

8. A unitary switch structure comprising a group of spaced terminals supported out of electrical connection with respect to each other and providing an intermediate terminal and a pair of outer terminals spaced from said intermediate terminal in opposite directions, a switch member supported for movement in electrical connection with said intermediate terminal and movable to a position where it electrically connects said intermediate terminal with one or the other of said outer terminals, a second group of terminals supported out of electrical connection with respect to each other and providing an intermediate terminal and a pair of outer terminals spaced from said intermediate terminal in opposite directions, fusible means adapted to be positioned in different positions where it electrically connects said intermediate terminal of said second group of terminals with one of the other of said outer terminals of said second group of terminals, and means for electrically connecting, respectively, the intermediate terminals of the first and second groups of terminals, and outer terminals of said first and second groups of terminals located at one side of said intermediate terminals of said first and second groups of terminals, and the outer terminals of said first and second groups of terminals located at the opposite side of said intermediate terminals of said first and second groups of terminals.

9. A unitary switch structure comprising a group of spaced terminals supported out of electrical connection with respect to each other and providing an intermediate terminal and a pair of outer terminals spaced from said intermediate terminal in opposite directions, a switch member supported for movement in electrical connection with said intermediate terminal and movable to a position where it electrically connects said intermediate terminal with one or the other of said outer terminals, a second group of terminals supported out of electrical connection with respect to each other and providing an intermediate terminal and a pair of outer terminals spaced from said intermediate terminals in opposite directions, fusible means adapted to be positioned in different positions where it electrically connects said intermediate terminal of said second group of terminals with one or the other of said outer terminals of said second group of terminals, and means for electrically connecting, respectively, the intermediate terminals of the first and second groups of terminals, the outer terminals of said first and second groups of terminals located at one side of said intermediate terminals of said first and second groups of terminals, and the outer terminals of said first and second groups of terminals located at the opposite side of said intermediate terminals of said first and second groups of terminals, said means for electrically connecting certain of the terminals of the first and second groups of terminals serving also to support the terminals electrically connected thereby.

10. A unitary switch structure comprising a group of spaced terminals supported out of electrical connection with respect to each other and providing an intermediate terminal and a pair of outer terminals spaced from said intermediate terminal in opposite directions, a switch member supported for movement in electrical connection with said intermediate terminal and movable to a position where it electrically connects said intermediate terminal with one or the other of said outer terminals, a second group of terminals supported out of electrical connection with respect to each other and providing an intermediate terminal and a pair of outer terminals spaced from said intermediate terminals in opposite directions, fusible means adapted to be positioned in different positions where it electrically connects said intermediate terminal of said second group of terminals with one or the other of said outer terminals of said second group of terminals, and means for electrically connecting, respectively, the intermediate terminals of the first and second groups of terminals, the outer terminals of said first and second groups of terminals located at one side of said intermediate terminals of said first and second groups of terminals, and the outer terminals of said first and second groups of terminals located at the opposite side of said intermediate terminals of said first and second groups of terminals, said means for electrically connecting certain of the terminals of the first and second groups of terminals comprising spaced bars serving also to support the terminals electrically connected thereby.

11. A unitary switch structure comprising a group of spaced terminals supported out of electrical connection with respect to each other and providing an intermediate terminal and a pair of outer terminals spaced from said intermediate terminal in opposite directions, a switch member supported for movement in electrical connection with said intermediate terminal and movable to a position where it electrically connects said intermediate terminal with one or the other of said outer terminals, a second group of terminals supported out of electrical connection with respect to each other and providing an intermediate terminal and a pair of outer terminals spaced from said intermediate terminals in opposite directions, fusible means adapted to be positioned in different positions where it electrically connects said intermediate terminal of said second group of terminals with one or the other of said outer terminals of said second group of terminals, means for electrically connecting, respectively, the intermediate terminals of the first and second groups of terminals, the outer terminals of said first and second groups of terminals located at one side of said intermediate terminals of said first and second groups of terminals, and the outer terminals of said first and second groups of terminals located at the opposite side of said intermediate terminals of said first and second groups of terminals, said means for electrically connecting certain of the terminals of the first and second groups of terminals comprising spaced bars serving also to support the terminals electrically connected thereby, and insulating means for supporting said spaced bars and the terminals of said first and second groups of terminals.

WALTER MAMMEL.
LINDELL LLOYD CRUMP.